United States Patent
Hong et al.

(10) Patent No.: US 8,916,013 B2
(45) Date of Patent: Dec. 23, 2014

(54) METHOD FOR TRANSFERRING GRAPHENE USING A HOT PRESS

(71) Applicants: Graphene Square Inc., Seoul (KR); Shin-in Park, Seoul (KR)

(72) Inventors: Byung Hee Hong, Seoul (KR); Jae Boong Choi, Yongin-si (KR); Youngjin Kim, Seoul (KR); Keun Soo Kim, Seoul (KR); Junmo Kang, Suwon-si (KR); Hyeongkeun Kim, Hwaseong-si (KR)

(73) Assignee: Graphene Square, Inc., Seoul (KR)

( * ) Notice: Subject to any disclaimer, the term of this patent is extended or adjusted under 35 U.S.C. 154(b) by 0 days.

(21) Appl. No.: 13/945,629

(22) Filed: Jul. 18, 2013

(65) Prior Publication Data

US 2013/0299077 A1 Nov. 14, 2013

Related U.S. Application Data

(63) Continuation of application No. PCT/KR2012/000417, filed on Jan. 18, 2012.

(30) Foreign Application Priority Data

Jan. 18, 2011 (KR) .................. 10-2011-0004948

(51) Int. Cl.
- *B29C 65/48* (2006.01)
- *B32B 37/26* (2006.01)
- *B32B 38/10* (2006.01)
- *B32B 43/00* (2006.01)
- *B82B 3/00* (2006.01)
- *B32B 37/00* (2006.01)

(52) U.S. Cl.
CPC ............. *B32B 37/025* (2013.01); *B82B 3/0047* (2013.01); *B82B 3/0076* (2013.01)
USPC ........................... 156/239; 156/249; 156/711

(58) Field of Classification Search
USPC .......................... 156/230, 239, 249, 701, 711
See application file for complete search history.

(56) References Cited

U.S. PATENT DOCUMENTS

| 6,627,037 B1* | 9/2003 | Kurokawa et al. ............ 156/712 |
| 2011/0048625 A1* | 3/2011 | Caldwell et al. .............. 156/233 |

FOREIGN PATENT DOCUMENTS

| JP | 2007-268876 | 10/2007 |
| KR | 10-2012-0046633 | 5/2010 |

OTHER PUBLICATIONS

International Search Report issued in International App. No. PCT/KR2012/000417, mailed Sep. 28, 2012.
Caldwell, Joshua D. et al. Technique for the dry transfer of epitaxial graphene onto arbitrary substrates. ACS Nano. 2010, vol. 4, No. 2, pp. 1108-1114.

(Continued)

*Primary Examiner* — Sing P Chan
(74) *Attorney, Agent, or Firm* — Greer Burns & Crain Ltd.

(57) ABSTRACT

The present invention relates to a method for transferring graphene using a hot press, comprising: a step of contacting graphene, having a thermal-releasable sheet attached thereto, with a target substrate; and a step of pressing and heating the graphene having the thermal-releasable sheet attached thereto and the target substrate using the upper press and lower press of a hot press so as to separate the thermal-releasable sheet and the graphene and transfer the separated graphene to the target substrate. The present invention also relates to a graphene-transfer hot press apparatus for said transfer process.

14 Claims, 10 Drawing Sheets

(56) References Cited

OTHER PUBLICATIONS

Li, Xuesong et al. Transfer of large-area graphene films for high-performance transparent conductive electrodes. Nano Letters. 2009, vol. 9, No. 12, pp. 4359-4363.

Juang, Zhen-Yu et al. Graphene synthesis by chemical vapor deposition and transfer by a roll-to-roll process. Carbon. 2010, vol. 48, pp. 3169-3174.

* cited by examiner

S1)

S2)

S3,S4)

FIG. 6(a)
FIG. 6(b)
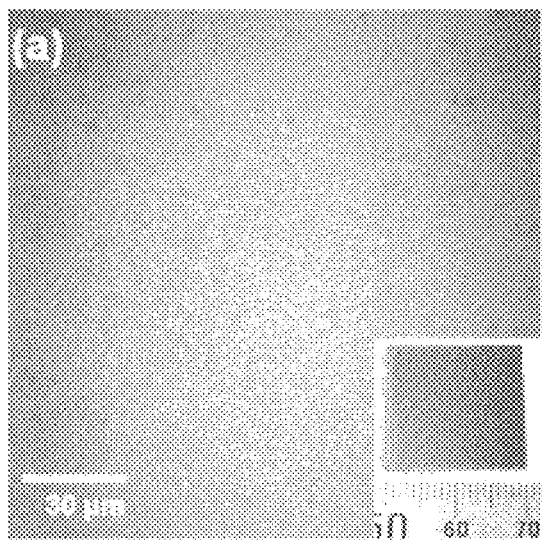
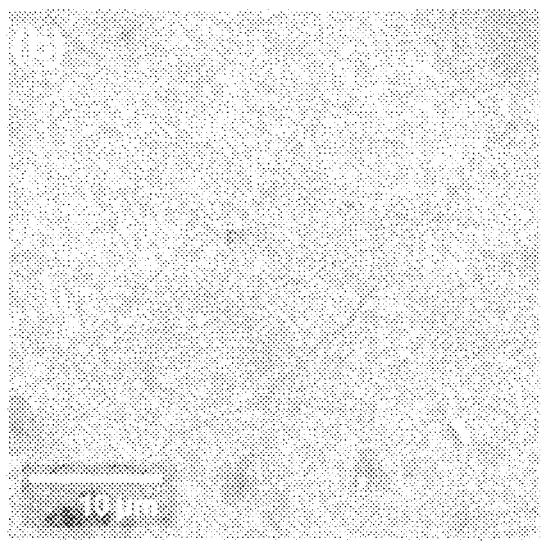

METHOD FOR TRANSFERRING GRAPHENE USING A HOT PRESS

CROSS-REFERENCE TO RELATED APPLICATION

This application is a continuation of International Application No. PCT/KR2012/000417 filed Jan. 18, 2012, claiming priority based on Korean Patent Application No. 10-2011-0004948 filed Jan. 18, 2011, the contents of all of which are incorporated herein by reference in their entirety.

TECHNICAL FIELD

The present disclosure relates to a method for transferring a large-area graphene onto a flexible substrate or rigid substrate by using a hot press.

BACKGROUND ART

Fullerene, carbon nanotubes, graphene, graphite, and the like are low-dimensional nano-materials composed of carbon atoms. That is, carbon atoms arranged in a hexagonal shape may form zero-dimensional fullerene formed of a ball, may form carbon nanotubes one-dimensionally rolled, may form graphene of a two-dimensional monolayer, and may form graphite three-dimensionally stacked.

In particular, graphene has very stable and excellent electrical, mechanical, and chemical characteristics and is a very excellent conductive material in which electrons can move about 100 times faster than in silicon and current flows about 100 times more than in copper. This was demonstrated through experiments in 2004 when a method of separating graphene from graphite was found. Since then, a great deal of research on this matter has been carried out.

Graphene is subject to large-area synthesis on a wafer or a metal substrate. Thus, in order to apply the graphene to an electronic device, a process for transferring synthesized graphene onto an electrode substrate of the electronic device is needed.

Korean Patent Laid-open Publication No. 2010-0046633 describes a method for removing a carbonization catalyst from a graphene sheet formed on the carbonization catalyst by using a salt solution as an oxidizer that oxidizes the carbonization catalyst and transferring the removed graphene sheet onto a substrate or a predetermined position on a device.

Further, in order to transfer graphene onto a substrate, conventionally, a dry process, a wet process, a roll-to-roll process, and the like have been used. However, such processes are difficult to be used to actually mass produce graphene due to time inefficiency and high cost. In particular, if graphene is transferred onto a substrate by a roll-to-roll process, a rigid substrate such as a wafer, a glass, or the like substrate cannot resist pressure and friction during a transferring process, resulting in damage to the graphene.

Therefore, for industrial application of graphene, a method for transferring large-area graphene at low cost in a short time is highly demanded.

DISCLOSURE OF THE INVENTION

Problems to be Solved by the Invention

In view of the foregoing, an objective of the present disclosure is to provide a method for efficiently transferring large-area graphene onto a flexible substrate and a rigid substrate by using a thermal-releasable sheet and a hot press.

However, problems to be solved by the present disclosure are not limited to the above-described problems. Although not described herein, other problems to be solved by the present disclosure can be clearly understood by those skilled in the art from the following descriptions.

Means for Solving the Problems

In order to achieve the objective, in accordance with a first aspect of the present disclosure, there is provided a graphene transferring method using a hot press, the method comprising making contact of graphene to which a thermal-releasable sheet is attached with a target substrate; and separating the thermal-releasable sheet from the graphene and transferring the separated graphene onto the target substrate at the same time by pressurizing and heating the graphene to which the thermal-releasable sheet is attached and the target substrate by using an upper press and a lower press of the hot press.

In accordance with a second aspect of the present disclosure, there is provided a graphene transferring apparatus using a hot press that includes a lower press onto which a substrate and graphene to which a thermal-releasable sheet is attached are loaded and an upper press, wherein the upper press and the lower press respectively include vacuum lines and independently control temperatures.

Effect of the Invention

According to the graphene transferring method using a hot press of the present disclosure, it is possible to transfer large-area graphene onto a flexible substrate and a rigid substrate. Further, it is possible to provide optimum transfer conditions by varying temperatures and pressures of upper/lower presses of the hot press depending on a kind of a substrate and also possible to minimize damage to graphene during a transferring process by providing vacuum lines on the upper/lower presses so as to fix a position of a target substrate. Furthermore, if the graphene transferring method using a hot press of the present disclosure is applied to a conventional batch-type process, it is possible to consecutively and readily transfer large-area graphene.

BRIEF DESCRIPTION OF THE DRAWINGS

FIG. 6s are an optical microscope photo (a) and a SEM image (b), respectively, of a surface shape of graphene transferred onto a 300 nm $SiO_2$/Si substrate by using a hot press in accordance with an example of the present disclosure.

BEST MODE FOR CARRYING OUT THE INVENTION

Figure 1:
FIG. 1 is a cross-sectional view of a graphene transferring apparatus using a hot press in accordance with an illustrative embodiment of the present disclosure.
Figure 1:
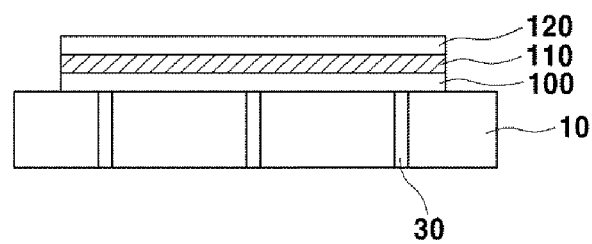
Figure 1:
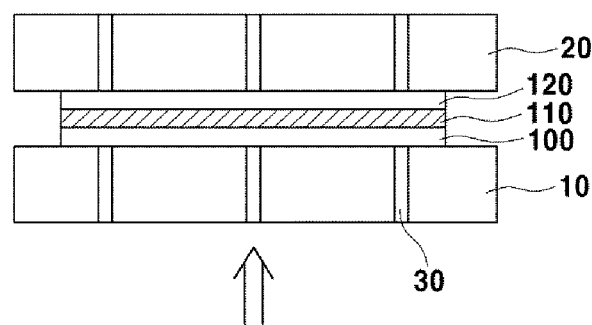
Figure 1:
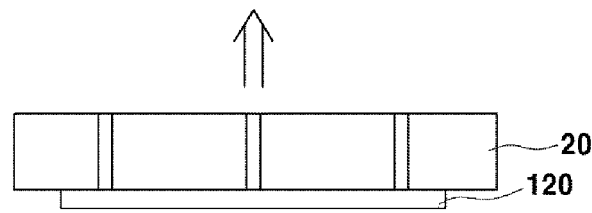
Figure 1:
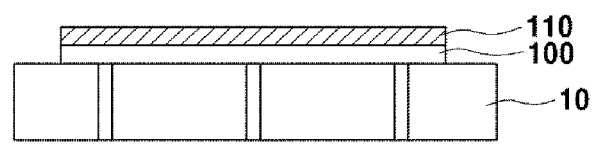
Figure 2A:
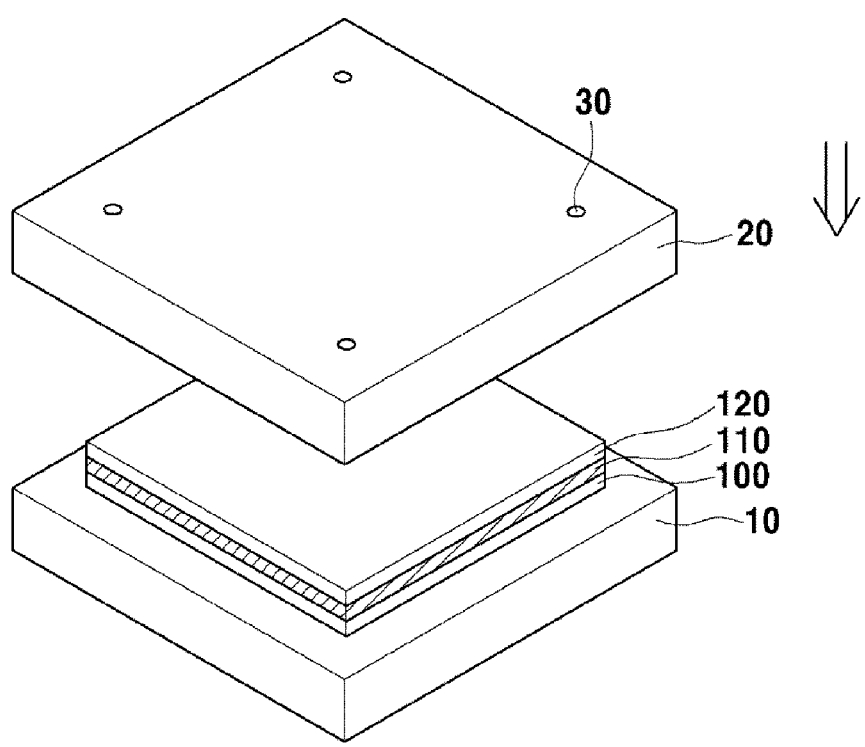
FIGS. 2A to 2C are perspective views of a graphene transferring apparatus using a hot press in accordance with an illustrative embodiment of the present disclosure.
Figure 2B:
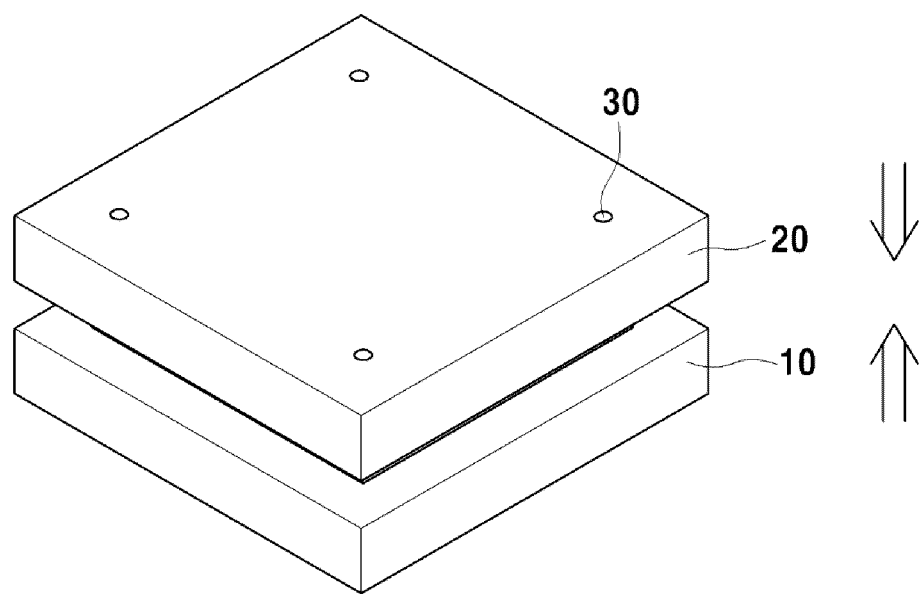
Figure 2C:
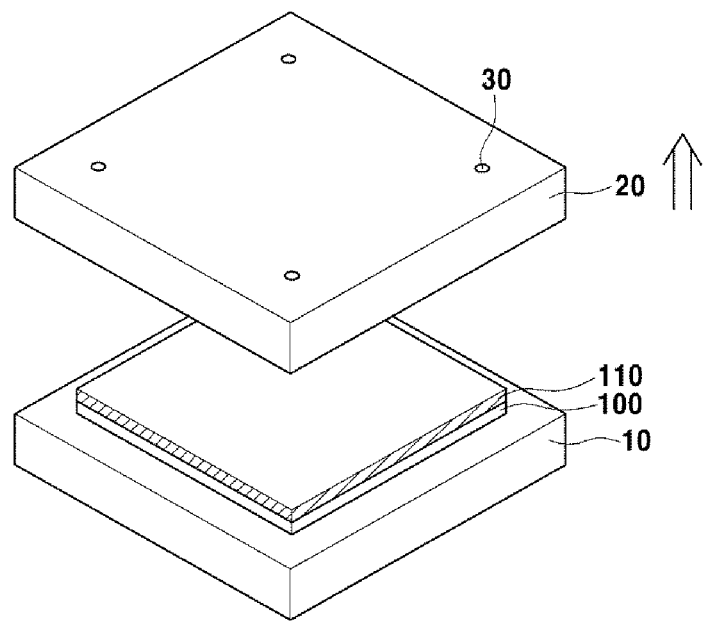
Figure 2C:
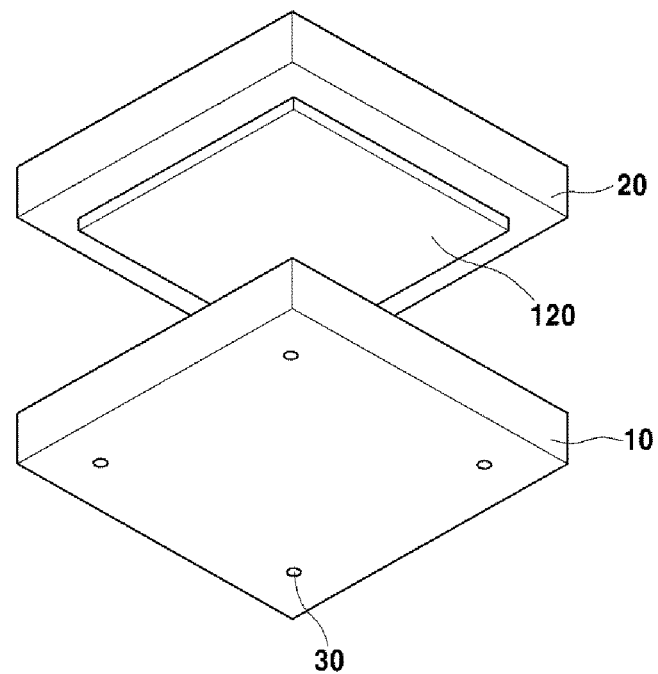

Hereinafter, illustrative embodiments and examples of the present disclosure will be described in detail with reference to the accompanying drawings so that the present disclosure may be readily implemented by those skilled in the art.

However, it is to be noted that the present disclosure is not limited to the illustrative embodiments and examples but can be embodied in various other ways. In drawings, parts irrelevant to the description are omitted for the simplicity of explanation, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

The term "about or approximately" or "substantially" used in the present specification is intended to have meanings close to numerical values or ranges specified with an allowable error and intended to prevent accurate or absolute numerical values disclosed for understanding of the present disclosure from being illegally or unfairly used by any unconscionable third party. Further, through the whole document, the term "step of" does not mean "step for".

Through the whole document, a phrase in the form "A and/or B" means "A", "B", or "A and B".

In accordance with a first aspect of the present disclosure, there is provided a graphene transferring method using a hot press, the method comprising making contact of graphene to which a thermal-releasable sheet is attached with a target substrate; and separating the thermal-releasable sheet from the graphene and transferring the separated graphene onto the target substrate at the same time by pressurizing and heating the graphene to which the thermal-releasable sheet is attached and the target substrate by using an upper press and a lower press of the hot press.

In an illustrative embodiment, the making contact and/or the transferring may be performed in, but may not be limited thereto, a vacuum condition or a normal pressure condition.

The thermal-releasable sheet may be used without particular limitation as long as the thermal-releasable sheet can be separated from the graphene by applying appropriate heat in a range equal to or less than a heat resistant temperature of the graphene and the target substrate and reducing a viscosity of the thermal-releasable sheet.

In another illustrative embodiment, the thermal-releasable sheet may be released in a range of, but may not be limited thereto, from about 90° C. to about 150° C. The thermal-releasable sheet may include a viscous resin, and the viscous resin may be used from those publicly known in the art without particular limitation. By way of example, the viscous resin may include, but may not be limited thereto, an epoxy resin.

In still another illustrative embodiment, the target substrate may include, but may not be limited thereto, a flexible substrate or a rigid substrate.

In still another illustrative embodiment, the rigid substrate may include what is selected from, but may not be limited thereto, the group consisting of an oxide substrate including a glass substrate, a Si substrate, a $SiO_2$ substrate, an ITO substrate, and the like; a metal substrate; and combinations thereof. For non-limited example, the metal substrate may include what is selected from, but may not be limited thereto, the group consisting of Cu, Ni, Fe, Al, Au, Ag, Mn, Co, and combinations thereof. For non-limited example, the oxide substrate may include, but may not be limited thereto, an oxide substrate of metal having an insulating property, a conductive property, or a semiconductor property. To be specific, the oxide substrate may include for example, but may not be limited thereto, a $SiO_2$ substrate, an ITO substrate, a $SnO_2$ substrate, a $TiO_2$ substrate, and an $Al_2O_3$ substrate.

In still another illustrative embodiment, the flexible substrate may include what is selected from, but may not be limited thereto, the group consisting of polyethylene terephthalate (PET), polyimide, polyethylene naphthalate (PEN), polycarbonate (PC), an elastomer polymer, and combinations thereof. By way of example, the elastomer polymer may be, but may not be limited thereto, transparent. By way of example, the elastomer polymer may include, but may not be limited thereto, polydimethylsiloxane (PDMS), poly(methylmethacrylate) (PMMA), or silicone rubber.

In still another illustrative embodiment, the flexible substrate may be, but may not be limited thereto, a transparent flexible substrate.

In still another illustrative embodiment, a temperature of the heating may be in a range of, but may not be limited thereto, from about 80° C. to about 200°0 C.

In still another illustrative embodiment, during the pressurizing process, the hot press may maintain a pressure in a range of, but may not be limited thereto, from about 300 psi to about 2,000 psi.

In still another illustrative embodiment, during the heating process, a temperature of the upper press may be, but may not be limited thereto, equal to or different from a temperature of the lower press.

The graphene may be produced by a method publicly known in the art, for example, but may not be limited thereto, various chemical vapor deposition methods.

In still another illustrative embodiment, the graphene may be formed by, but may not be limited thereto, supplying a reaction gas containing a carbon source and heat onto the substrate and making a reaction therebetween. For non-limited example, the carbon source may include, but may not be limited thereto, a gaseous or liquid carbon source.

In still another illustrative embodiment, after the transferring process, the graphene transferring method may further include washing the transferred graphene, but the present disclosure may not be limited thereto.

In still another illustrative embodiment, the graphene to which the thermal-releasable sheet is attached may include, but may not be limited thereto, one or more layers of graphene.

In accordance with a second aspect of the present disclosure, there is provided a graphene transferring apparatus using a hot press that includes a lower press onto which a substrate and graphene to which a thermal-releasable sheet is attached are loaded and an upper press, and the upper press and the lower press respectively include vacuum lines and independently control temperatures.

In an illustrative embodiment, the graphene transferring apparatus using the hot press may further include, but may not be limited thereto, water-cooling type heating units within the upper press and the lower press, respectively. The water-cooling type heating units are provided to uniformly transfer heat during the transferring process and configured to induce heating and cooling of the graphene, the thermal-releasable sheet, and the target substrate and more smoothly transfer heat to the thermal-releasable sheet during the transferring process.

The graphene transferring apparatus using a hot press may include all the descriptions related to the graphene transferring method using the hot press and redundant descriptions will be omitted for convenience.

Hereinafter, a graphene transferring method using a hot press and a graphene transferring apparatus using the hot press of the present disclosure will be explained in detail with reference to accompanying drawings. However, the present disclosure is not limited thereto.

FIGS. 1 and 2A to 2C respectively provide a cross-sectional view and perspective views of a graphene transferring apparatus using a hot press in accordance with an illustrative embodiment of the present disclosure. Referring to FIG. 1, a graphene transferring apparatus using a hot press of the present disclosure includes a lower press 10 and an upper press 20, and if necessary, vacuum lines 30 may be respectively formed within the lower press 10 and the upper press 20. If the vacuum lines 30 are formed within the lower press 10 and/or the upper press 20, the vacuum lines 30 of the lower press 10 can prevent a target substrate 100 or graphene 110 to which a thermal-releasable sheet 120 is attached from shaking or slipping by forming a vacuum atmosphere while the graphene 110 to which the thermal-releasable sheet 120 is attached is transferred onto the target substrate. Further, the vacuum lines 30 of the upper press 20 enables the thermal-releasable sheet 120 to be easily separated from the graphene 110 by forming a vacuum atmosphere after the graphene 110 is transferred onto the target substrate 100.

The graphene transferring apparatus using a hot press of the present disclosure can control temperatures and pressures while the graphene 110 is transferred.

A temperature for a transferring process of the graphene 110 can be controlled by adjusting temperatures of the lower press 10 and the upper press 20. The temperature for the transferring process is not limited as long as it is in a range equal to or less than a heat resistant temperature of the target substrate 100 and the graphene 110 in which the graphene 110 and the thermal-releasable sheet 120 attached to the graphene 110 can be separated from each other. For non-limited example, a heating temperature for the transferring process may be in a range of from about 80° C. to about 200° C., from about 80° C. to about 180° C., from about 80° C. to about 160° C., from about 80° C. to about 140° C., from about 80° C. to about 120° C., from about 80° C. to about 100° C., from about 100° C. to about 200° C., from about 100° C. to about 180° C., from about 100° C. to about 160° C., from about 100° C. to about 140° C., from about 100° C. to about 120° C., from about 120° C. to about 200° C., from about 120° C. to about 180° C., from about 120° C. to about 160° C., from about 120° C. to about 140° C., from about 150° C. to about 200° C., from about 150° C. to about 180° C., or from about 150° C. to about 160° C. An optimum temperature for the transferring process of the graphene 110 may vary depending on a thickness of the target substrate 100, a kind of the target substrate 100, and a thickness and a kind of the thermal-releasable sheet 120, and, thus, graphene can be transferred efficiently by adjusting temperatures of the upper press 20 and the lower press 10. Further, a temperature of the upper press 20 can be controlled to be equal to a temperature of the lower press 10, but if necessary, a temperature of the upper press 20 can be controlled to be different from a temperature of the lower press 10.

Further, during the transferring process of the graphene 110, the hot press can maintain a pressure in a range of from about 300 psi to about 2,000 psi, from about 300 psi to about 1,800 psi, from about 300 psi to about 1,600 psi, from about 300 psi to about 1,400 psi, from about 300 psi to about 1,200 psi, from about 300 psi to about 1,000 psi, from about 300 psi to about 800 psi, from about 300 psi to about 600 psi, from about 300 psi to about 400 psi, from about 500 psi to about 2,000 psi, from about 500 psi to about 1,800 psi, from about 500 psi to about 1,600 psi, from about 500 psi to about 1,400 psi, from about 500 psi to about 1,200 psi, from about 500 psi to about 1,000 psi, from about 500 psi to about 800 psi, from about 500 psi to about 600 psi, from about 1,000 psi to about 2,000 psi, from about 1,000 psi to about 1,800 psi, from about 1,000 psi to about 1,600 psi, from about 1,000 psi to about 1,400 psi, from about 1,000 psi to about 1,200 psi, from about 1,500 psi to about 2,000 psi, from about 1,500 psi to about 1,800 psi, or from about 1,500 psi to about 1,600 psi. In an illustrative embodiment, the pressure can be maintained by fixing any one substrate of the lower press 10 and the upper press 20 and adjusting a height of other substrate by a hydraulic pressure.

If graphene is transferred onto a rigid substrate such as a wafer, a glass, and the like substrate by a conventional roll-to-roll method, the substrate cannot resist pressure and friction between the rolls due to its thickness, resulting in damage to the graphene. Further, if graphene is transferred onto a flexible substrate such as PET by the conventional roll-to-roll method, the substrate can be deformed by heat and pressure due to a structural limitation of the rolls.

Thus, as described above, based on a method for transferring the graphene 110 by using the thermal-releasable sheet 120, the present disclosure provides a method for effectively transferring the graphene 110 onto the target substrate by using the hot press that applies heat and pressure to the graphene 110 to which the thermal-releasable sheet 120 is attached. Further, the present disclosure provides a method for effectively transferring the graphene onto a rigid substrate such as a Si wafer, a metal substrate, an ITO, a glass, an oxide substrate, and the like as well as a flexible substrate by using the above-described hot press method.

Figure 3:
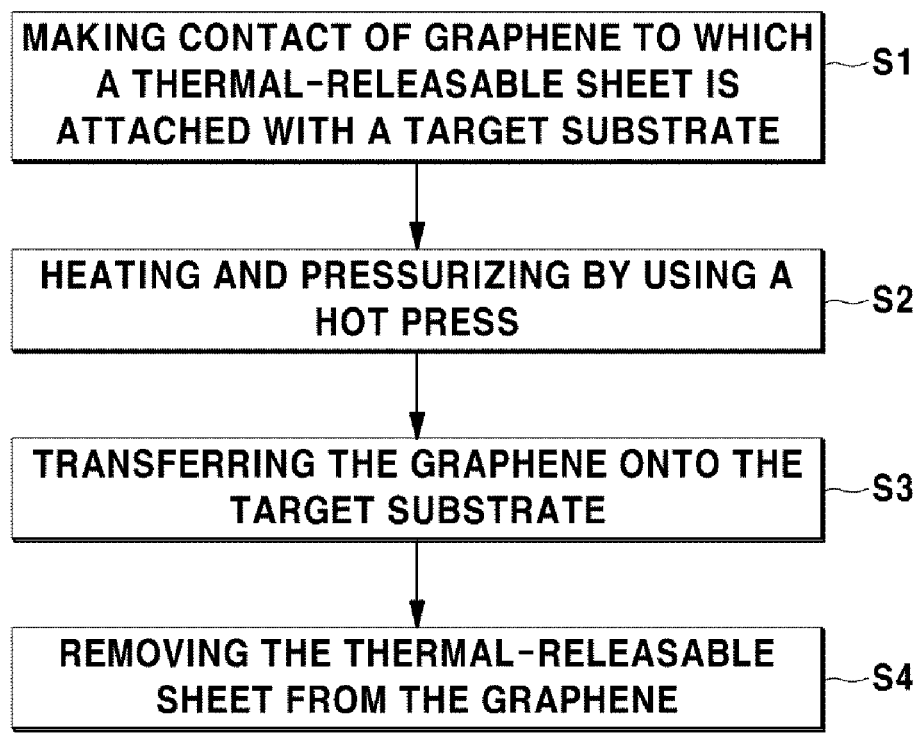
FIG. 3 is a flowchart that shows a graphene transferring method using a hot press in accordance with an illustrative embodiment of the present disclosure.

Referring to FIG. 3, a graphene transferring method using a hot press in accordance with an illustrative embodiment of the present disclosure includes a step of making contact of graphene to which a thermal-releasable sheet is attached with a target substrate (S1); a step of heating and pressurizing the graphene to which the thermal-releasable sheet is attached and the target substrate by using a hot press (S2); a step of transferring the graphene onto the target substrate (S3); and a step of removing the thermal-releasable sheet from the graphene (S4).

First, the graphene to which the thermal-releasable sheet is attached is positioned on the transfer target substrate (S1). Then, the target substrate and the graphene to which the thermal-releasable sheet is attached on the target substrate are pressurized by adjusting a height of a lower press or an upper press. As described above, at the same time when being pressurized, the target substrate and the graphene are heated by adjusting a temperature of the lower press or the upper press (S2). According to the transferring method using the hot press of the present disclosure, heat and pressure are applied to the whole area of the graphene during the pressurizing/heating step, and, thus, unlike the conventional roll-to-roll method, the target substrate may be less damaged and even if the graphene is transferred onto a rigid substrate, a graphene loss can be minimized (S3). Additionally, as described above, a vacuum atmosphere is formed by using vacuum lines of the upper press and the lower press, and, thus, it is possible to minimize a graphene loss which may be made during the transferring step. By way of example, vacuum lines of the lower press form a vacuum atmosphere during all the steps S1 to S4, and, thus, it is possible to prevent the target substrate on the lower press from shaking or slipping.

The thermal-releasable sheet can be easily separated from the graphene in such a way that a viscous material constituting the thermal-releasable sheet reacts by heat at a high temperature of, for example, about 80° C. or more, about 100° C. or more, about 150° C. or more, or about 300° C. or more and becomes degenerated, and an adhesive strength between the thermal-releasable sheet and the graphene formed on the thermal-releasable sheet becomes weakened.

After the graphene is transferred on the target substrate as described above (S3), the thermal-releasable sheet is removed from the graphene (S4) and a process for transferring the graphene is completed. Further, during the step S4, it is possible to separate the thermal-releasable sheet from the graphene more easily by using the upper press including vacuum lines.

In a non-limited example of removing the thermal-releasable sheet, a vacuum atmosphere may be formed by the vacuum lines of the upper press so as to adsorb the upper press and the thermal-releasable sheet and the thermal-releasable sheet having a reduced adhesion strength with a respect to the graphene may be removed from the graphene on the target substrate.

During the steps S1 to S4, a step of washing the substrate on which the graphene is transferred may be further included. By the washing step, residues on a surface of the graphene, for example, the thermal-releasable sheet's residues which are not completely separated from the surface of the graphene and remain thereon during the transferring step, are removed, and, thus, a surface condition of the graphene can be improved.

The graphene transferred onto the target substrate as described above can be grown on the substrate. The method for forming graphene on the substrate may be used without limitation from chemical vapor deposition methods typically used in the art for growing graphene and may include, for example, but may not be limited thereto, a rapid thermal chemical vapor deposition (RTCVD) method, an inductively coupled plasma-chemical vapor deposition (ICP-CVD) method, a low pressure chemical vapor deposition (LPCVD) method, an atmospheric pressure chemical vapor deposition (APCVD) method, a metal organic chemical vapor deposition (MOCVD) method, or a plasma-enhanced chemical vapor deposition (PECVD) method.

The graphene can be grown on the target substrate by supplying a gaseous carbon source and performing a heat treatment thereto. In an illustrative embodiment, if a metal catalyst layer is put in a chamber and while supplying a carbon source such as carbon monoxide, ethane, ethylene, ethanol, acetylene, propane, butane, butadiene, pentane, pentene, cyclopentadiene, hexane, cyclohexane, benzene, toluene, and the like in a gaseous state, a heat treatment is performed at a temperature in a range of, for example, from about 300° C. to about 2,000° C., from about 300° C. to about 1,800° C. from about 300° C. to about 1,600° C., from about 300° C. to about 1,400° C. from about 300° C. to about 1,200° C., from about 300° C. to about 1,000° C. from about 300° C. to about 800° C., from about 300° C. to about 600° C., from about 300° C. to about 400° C., from about 500° C. to about 2,000° C., from about 500° C. to about 1,800° C. from about 500° C. to about 1,600° C., from about 500° C. to about 1,400° C., from about 500° C. to about 1,200° C., from about 500° C. to about 1,000° C., from about 500° C. to about 800° C., from about 500° C. to about 600° C., from about 1,000° C. to about 2,000° C., from about 1,000° C. to about 1,800° C., from about 1,000r to about 1,600° C., from about 1,000° C. to about 1,400° C., from about 1,000° C. to about 1,200° C., from about 1,500° C. to about 2,000° C., from about 1,500° C. to about 1,800° C., or from about 1,500° C. to about 1,600° C., carbon components from the carbon source are bounded to one another so as to form graphene in a hexagonal plate shape. When this graphene is cooled, graphene having a uniform arrangement can be obtained.

The process for growing graphene can be performed in normal pressure, low pressure, or vacuum conditions. By way of example, if the process is performed in a normal pressure condition, helium (He) or the like is used as a carrier gas, and, thus, it is possible to minimize damage to graphene caused by collision with argon (Ar) which is heavy at high temperatures. Further, if the process is performed in the normal pressure condition, large-area graphene can be produced by a simple process at low cost. Furthermore, if the process is performed in low pressure or vacuum conditions, when hydrogen ($H_2$) is used as an atmosphere gas and a temperature is increased, an oxidized surface of a metal catalyst can be reduced. Thus, it is possible to form high-quality graphene.

Further, the substrate on which the graphene is grown may exist as a substrate or may further include a catalyst layer (not illustrated). A material of the substrate is not particularly limited and may include one or more metals or alloys selected from, for example, the group consisting of silicon, Ni, Co, Fe, Pt, Au, Al, Cr, Cu, Mg, Mn, Mo, Rh, Si, Ta, Ti, W, U, V, Zr, brass, bronze, white brass, stainless steel, and Ge. If the substrate is made of metal, the substrate itself can act as a catalyst for forming a graphene layer. However, the substrate is not necessarily made of metal. By way of example, the substrate may be made of silicon, or the silicon substrate may further include a silicon oxide layer formed by oxidizing the silicon substrate for forming a catalyst layer thereon.

Further, a catalyst layer may be formed on the substrate in order to make it easy to grow graphene. The catalyst layer can be used without limitation in material, thickness, and shape. By way of example, the catalyst layer may be one or more metals or alloys selected from the group consisting of Ni, Co, Fe, Pt, Au, Al, Cr, Cu, Mg, Mn, Mo, Rh, Si, Ta, Ti, W, U, V, Zr, brass, bronze, white brass, stainless steel, and Ge, and may be made of a material identical with or different from the substrate. Further, a thickness of the catalyst layer is not limited and may be a thin film or a thick film.

The graphene formed by the above-described method may have a large area with a horizontal or longitudinal length of from about 1 mm or more to about 1,000 m, from about 1 mm or more to about 800 m, from about 1 mm or more to about 600 m, from about 1 mm or more to about 400 m, from about 1 mm or more to about 200 m, from about 1 mm or more to about 100 m, from about 1 mm or more to about 50 m, from about 1 mm or more to about 10 m, from about 1 mm or more to about 1 m, from about 100 m or more to about 1,000 m, from about 100 m or more to about 800 m, from about 100 m or more to about 600 m, from about 100 m or more to about 400 m, from about 100 m or more to about 200 m, from about 500 m or more to about 1,000 m, from about 500 m or more to about 800 m, from about 500 m or more to about 600 m, or from about 800 m or more to about 1,000 m. Further, the graphene includes graphene layer having a homogeneous structure with few defects. The graphene formed by the above-described method may include one or more layers of graphene. For non-limited example, a thickness of the graphene can be adjusted in a range of from about 1 layer to about 100 layers, from about 1 layer to about 80 layers, from about 1 layer to about 60 layers, from about 1 layer to about 40 layers, from about 1 layer to about 20 layers, from about 1 layer to about 10 layers, from about 10 layers to about 100 layers, from about 10 layers to about 80 layers, from about 10 layers to about layers, from about 10 layers to about 40 layers, from about 10 layers to about 20 layers, from about 20 layers to about 100 layers, from about 20 layers to about 80 layers, from about 20 layers to about 60 layers, from about 20 layers to about 40 layers, from about 50 layers to about 100 layers, from about 50 layers to about 80 layers, from about 50 layers to about 60 layers, or from about 70 layers to about 100 layers.

Hereinafter, the present disclosure will be explained in more detail with reference to Examples and the accompanying drawings. However, the present disclosure is not limited thereto.

Example 1

Figure 4A:
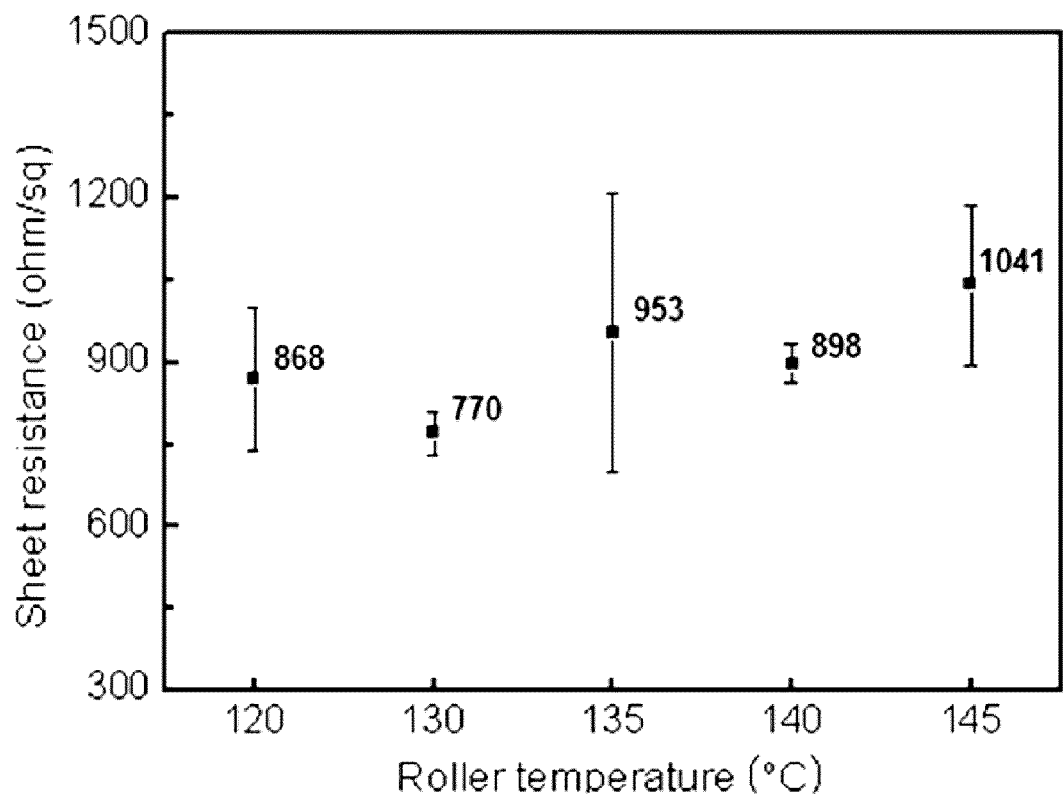
FIGS. 4A and 4B are graphs of sheet resistances of graphene produced by a graphene transferring method using a hot press in accordance with an example of the present disclosure and a roll-to-roll transferring method.
Figure 4B:
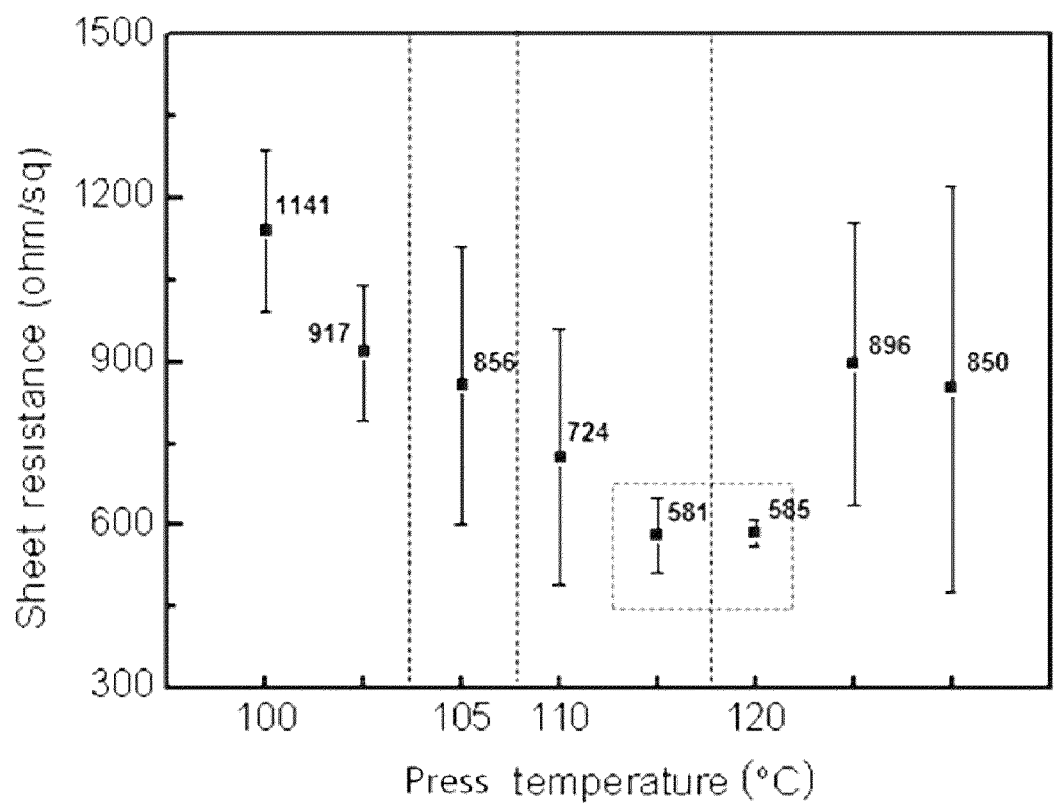

FIGS. 4A and 4B are graphs comparing sheet resistances between graphene transferred onto a PET substrate by a graphene transferring method using a hot press in accordance with present Example and graphene transferred onto a PET substrate by a roll-to-roll transferring method, respectively. In FIGS. 4A and 4B, the graphenes used were formed in the same condition and transferred onto the PET substrates by using thermal-releasable sheets. To be more specific, the graphenes grown on Cu substrates were separated from the Cu substrates by using each of thermal-releasable sheets manufactured by Nitto Denko Co., Ltd. in Japan and Jinsung Chemical Co., Ltd. in South Korea and the graphenes respectively were transferred onto the PET substrates. In a comparative example, when graphene was transferred by a roll-to-roll method, an upper roller and a lower roller were controlled to have the same temperature and a transferring temperature was maintained in a range of from about 120° C. to about 145° C., and when graphene was transferred by using a hot press, upper and lower presses were controlled to have the same temperature and the upper press and a lower press were maintained at a temperature in a range of from about 80° C. to about 150° C.

A sample formed by the above-described method had a size of 2×4 cm² and a sheet resistance thereof was measured by using a 4-point probe. As shown in FIG. 4A, at a transferring temperature of about 120° C., the graphene formed by the roll-to-roll transferring method had a sheet resistance of about 868 ohm/sq, whereas as shown in FIG. 4B, the graphene formed by the transferring method using the hot press had a sheet resistance of about 585 ohm/sq. Therefore, it could be seen that in a specific condition, the graphene formed by using the hot press had a superior sheet resistance to that of the graphene formed by the roll-to-roll transferring method.

Figure 5:
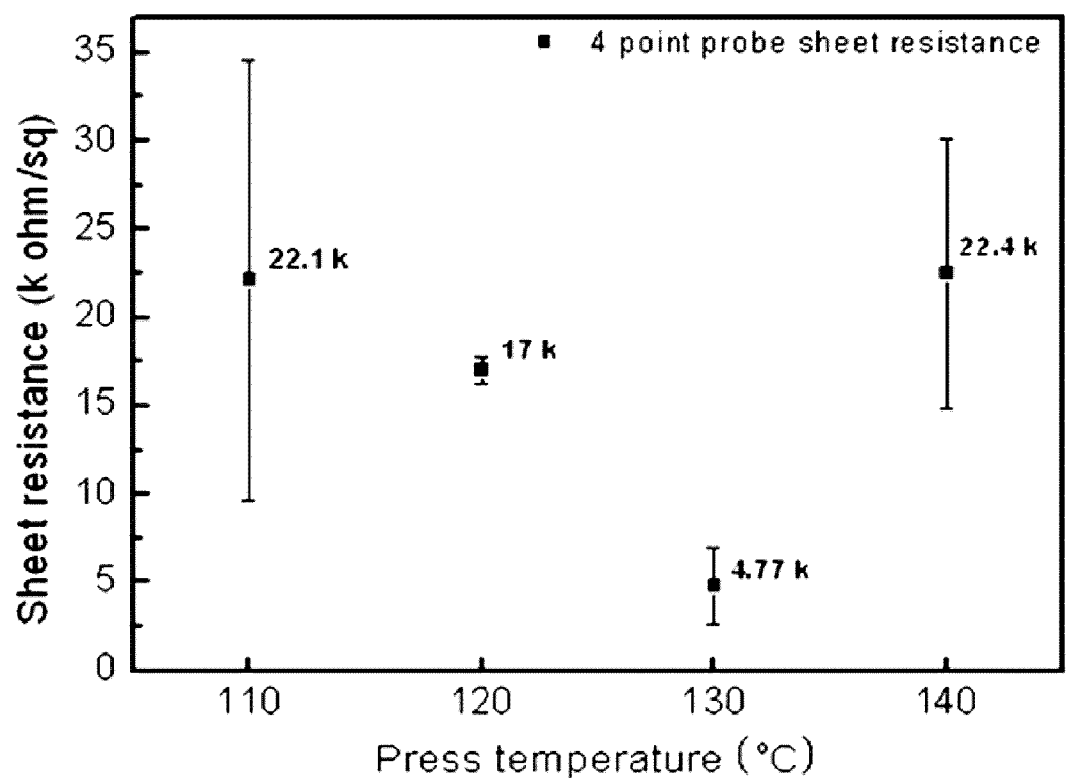
FIG. 5 is a graph of a sheet resistance of a graphene film transferred onto a glass substrate by using a hot press in accordance with an example of the present disclosure.

FIG. 5 is a graph of a sheet resistance of graphene transferred onto a rigid glass substrate by using a hot press. To be more specific, it was monitored whether or not graphene could be transferred onto a rigid glass substrate throughout a transferring temperature range of from about 110° C. to about 140° C. and a sheet resistance of the transferred graphene was measured. The glass substrate had a thickness of from about 0.13 mm to about 0.17 mm and a size of about 22×22 mm². As a measurement result of the sheet resistance of the transferred graphene, it could be seen that the graphene was transferred onto the rigid glass substrate throughout the transferring temperature range and the graphene had an excellent sheet resistance.

Example 2

FIGS. 6s are an optical microscope photo (a) and a SEM image (b), respectively, of a surface shape of graphene transferred onto a 300 nm SiO₂/Si substrate by using a hot press. A partially bright portion indicated a damaged portion of graphene, and a dotted and dark portion indicated a portion formed in multiple layers. (A portion indicated by a line was a portion overlapped when the graphene was formed or transferred). As can be seen from the above result, it was found that by using a hot press, graphene could be transferred onto a rigid substrate with less damage.

Figure 7:
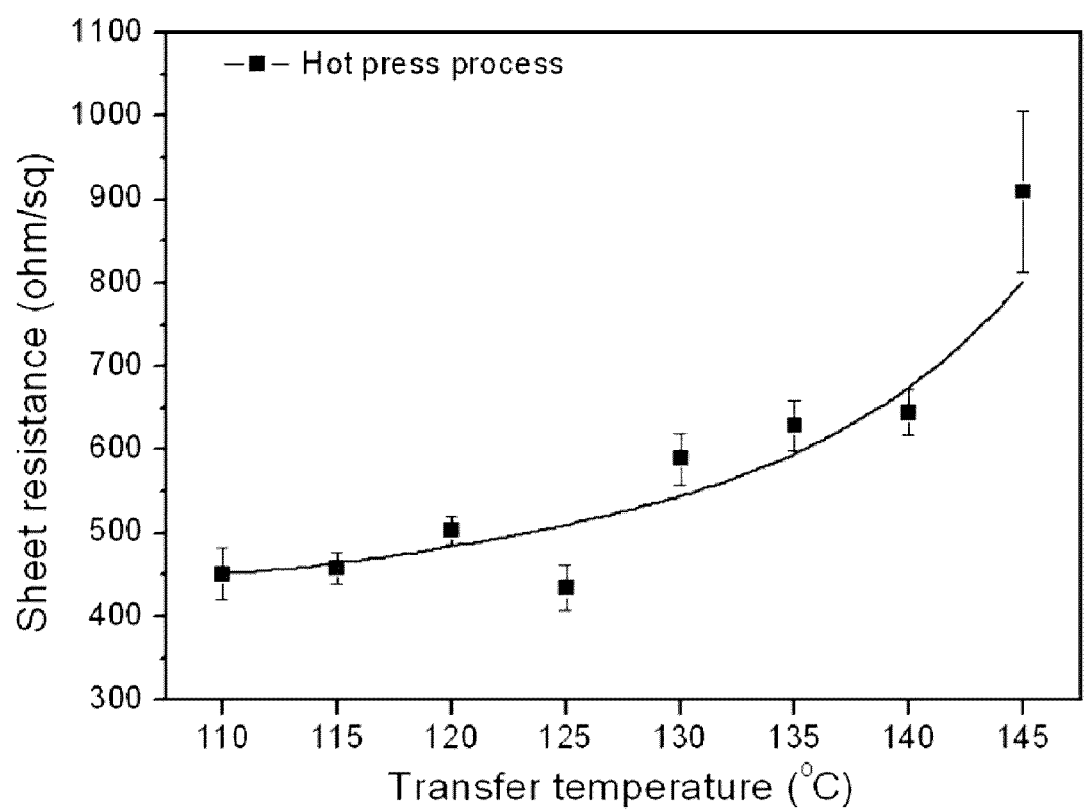
FIG. 7 is a graph of a sheet resistance of graphene transferred onto a $SiO_2$/Si substrate by using a hot press in accordance with an example of the present disclosure.

FIG. 7 is a graph of a sheet resistance of graphene transferred onto a SiO₂/Si substrate by using a hot press. In order to check whether or not graphene was well transferred onto the SiO₂/Si substrate, sheet resistances of samples in respective transferring conditions were measured by using a 4-point probe and a result thereof was arranged. The result is that the sheet resistance of graphene was increased as the transferring temperature was increased. It was determined that the graphene was not deformed by heat but a thermal-releasable sheet was deformed by high-temperature heat since the thermal-releasable sheet was based on a polymer and affected a transferring property of the graphene. Nevertheless, the sheet resistance of the graphene was similar to a sheet resistance of graphene typically transferred onto a PET substrate. Thus, it was confirmed that by using a hot press, graphene could be transferred onto a rigid substrate with few defects.

Although the present disclosure has been explained with reference to the illustrative embodiments and examples, it would be understood by those skilled in the art that various changes and modifications may be made without changing technical conception and essential features of the present disclosure as described in the claims.

What is claimed is:

1. A graphene transferring method, comprising:
   making contact of graphene to which a thermal-releasable sheet is attached with a target substrate;
   separating the thermal-releasable sheet from the graphene and transferring the separated graphene onto the target substrate at the same time by pressurizing and heating the graphene to which the thermal-releasable sheet is attached and the target substrate in between a first press and a second press opposite the first press;
   wherein the target substrate is adhered to the second press during the transferring of the graphene, by a vacuum atmosphere formed by a plurality of vacuum lines in the second press to prevent the target substrate from slipping on the second press;
   wherein temperatures of heat generated by the first press and the second press are independently controlled; and
   wherein the thermal-releasable sheet includes viscous resin.

2. The graphene transferring method of claim 1, wherein the thermal-releasable sheet is released in a range of from about 90° C. to about 150° C.

3. The graphene transferring method of claim 1, wherein the target substrate includes a flexible substrate or a rigid substrate.

4. The graphene transferring method of claim 3, wherein the rigid substrate includes what is selected from the group consisting of a glass substrate, an ITO substrate, a Si substrate, a SiO2 substrate, a metal substrate, and combinations thereof.

5. The graphene transferring method of claim 3, wherein the flexible substrate includes what is selected from the group consisting of polyethylene terephthalate (PET), polyimide, polyethylene naphthalate (PEN), polycarbonate (PC), an elastomer polymer, and combinations thereof.

6. The graphene transferring method of claim 5, wherein the elastomer polymer includes polydimethylsiloxane (PDMS), poly (methylmethacrylate) (PMMA), or silicone rubber.

7. The graphene transferring method of claim 1, wherein a temperature of the heating is in a range of from about 80° C. to about 200° C.

8. The graphene transferring method of claim 1, wherein during the heating process, a temperature of the first press is equal to or different from a temperature of the second press.

9. The graphene transferring method of claim 1, wherein during the pressurizing process, a pressure is in a range of from about 300 psi to about 2,000 psi.

10. The graphene transferring method of claim 1, wherein the graphene is formed by supplying a reaction gas containing a carbon source and heat onto the target substrate and making a reaction therebetween.

11. The graphene transferring method of claim 1, further including:
   after the transferring of the separated graphene onto the target substrate, washing the transferred graphene.

12. The graphene transferring method of claim 1, wherein the graphene to which the thermal-releasable sheet is attached includes one or more layers of graphene.

13. The graphene transferring method of claim 1, further comprising:
   forming a vacuum atmosphere between the thermal-releasable sheet and the first press, so that the thermal-releasable sheet is adhered to the first press during the separating of the thermal-releasable sheet from the graphene.

14. The graphene transferring method of claim 1, wherein the graphene is heated by heat generated by the first press and the second press.

* * * * *